(12) United States Patent
Ouellette

(10) Patent No.: US 9,771,163 B2
(45) Date of Patent: Sep. 26, 2017

(54) SHORT TAKEOFF AND LANDING AIRCRAFT

(71) Applicant: The Boeing Company, Chicago, IL (US)

(72) Inventor: Rich P. Ouellette, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 14/231,003

(22) Filed: Mar. 31, 2014

(65) Prior Publication Data

US 2015/0183522 A1     Jul. 2, 2015

Related U.S. Application Data

(60) Provisional application No. 61/922,752, filed on Dec. 31, 2013.

(51) Int. Cl.
| | | |
|---|---|---|
| *B64D 41/00* | (2006.01) | |
| *B64F 1/04* | (2006.01) | |
| *B64F 3/02* | (2006.01) | |
| *B64D 27/24* | (2006.01) | |
| B64D 27/02 | (2006.01) | |

(52) U.S. Cl.
CPC .......... *B64D 41/00* (2013.01); *B64D 27/24* (2013.01); *B64F 1/04* (2013.01); *B64F 3/02* (2013.01); *B64C 2201/06* (2013.01); *B64C 2201/08* (2013.01); *B64D 2027/026* (2013.01); *Y10S 903/902* (2013.01)

(58) Field of Classification Search
CPC ..... B64F 1/04; B60L 2200/10; B64C 2201/08
See application file for complete search history.

(56) References Cited

U.S. PATENT DOCUMENTS

| | | | |
|---|---|---|---|
| 3,715,991 A | 2/1973 | Boyd | |
| 7,040,574 B2 * | 5/2006 | Richards | ............... B64C 35/008 |
| | | | 114/272 |
| 7,165,745 B2 * | 1/2007 | McGeer | ............... B64C 39/024 |
| | | | 244/114 R |

(Continued)

FOREIGN PATENT DOCUMENTS

| | | |
|---|---|---|
| CN | 102991672 | 3/2013 |
| DE | 102009026982 | 3/2011 |

(Continued)

OTHER PUBLICATIONS

"AIR HOGS Sky Blazer." (product manual). Spin Master Toys. 2002. Retrieved online from: http://spinmaster.frontlinesvc.com/ci/fattach/get/50030/1274278718/redirect/1/session/L2F2LzEyd-GltZS8xNDYyNTY1NzU3L3NpZC9qM253WVFQbQ==/filename/AH_Skyblazer_IS.pdf.*

(Continued)

*Primary Examiner* — Philip J Bonzell
*Assistant Examiner* — Michael Kreiner
(74) *Attorney, Agent, or Firm* — Hanley, Flight & Zimmerman, LLC

(57) ABSTRACT

Short takeoff and landing aircraft are disclosed. An example fixed wing aircraft includes a primary power source to provide power to a propulsion unit, a secondary power source to provide power to the propulsion unit, and a detachable power coupling to transfer power to the secondary power source from a source external to the fixed wing aircraft during takeoff.

14 Claims, 13 Drawing Sheets

(56) References Cited

U.S. PATENT DOCUMENTS

| | | | |
|---|---|---|---|
| 7,335,067 B2 * | 2/2008 | Lee | B64F 1/06 439/289 |
| 7,398,946 B1 * | 7/2008 | Marshall | B60L 11/1816 191/10 |
| 8,469,306 B2 * | 6/2013 | Kuhn, Jr. | B64C 29/0033 244/12.4 |
| 8,511,606 B1 * | 8/2013 | Lutke | B64C 39/028 244/100 R |
| 9,174,741 B2 * | 11/2015 | Suntharalingam | B64D 27/02 |
| 2008/0006739 A1 * | 1/2008 | Mochida | B64C 27/04 244/60 |
| 2008/0184906 A1 * | 8/2008 | Kejha | B64C 39/024 102/374 |
| 2011/0108663 A1 * | 5/2011 | Westenberger | B64D 27/02 244/60 |
| 2011/0168835 A1 | 7/2011 | Oliver | |
| 2012/0209456 A1 * | 8/2012 | Harmon | B64C 39/024 701/3 |
| 2013/0049687 A1 * | 2/2013 | Hershey | H02J 7/0042 320/109 |
| 2013/0227950 A1 * | 9/2013 | Anderson | B64D 27/24 60/718 |

FOREIGN PATENT DOCUMENTS

| | | |
|---|---|---|
| GB | 1298886 | 12/1972 |
| WO | 0107318 | 2/2001 |
| WO | 2008065065 | 6/2008 |

OTHER PUBLICATIONS

European Patent Office, "Extended European Search Report," issued in connection with Application No. 14187036.0, May 21, 2015, 6 pages.

* cited by examiner

SHORT TAKEOFF AND LANDING AIRCRAFT

RELATED APPLICATION

This patent claims priority to U.S. Provisional Patent Application Ser. No. 61/922,752, filed Dec. 31, 2013. The entirety of U.S. Provisional Patent Application Ser. No. 61/922,752 is incorporated by reference herein.

FIELD OF THE DISCLOSURE

This disclosure relates generally to aircraft, and, more particularly, to short takeoff and landing aircraft.

BACKGROUND

Many naval assets have extremely short takeoff flight deck lengths to support vertical takeoff and landing (VTOL) aircraft, such as helicopters or rotorcraft. Fixed wing aircraft generally require longer deck lengths or relatively high lift area (e.g., wing area) to take off. While fixed wing aircraft having high vertical lift capabilities are feasible, such aircraft have certain limitations. While naval assets can be designed or modified to provide sufficient launch thrust to a fixed wing aircraft, such modifications or designs may be impractical (e.g., too costly), may limit the performance characteristics of the naval asset, and/or may be infeasible for certain assets. Thus, naval assets having short takeoff flight deck lengths preclude the use of highly efficient fixed wing aircraft. There is a need for efficient fixed wing aircraft that can take off and land on a short takeoff deck.

SUMMARY

Example fixed wing aircraft disclosed herein include a primary power source to provide power to a propulsion unit, a secondary power source to provide power to the propulsion unit, and a detachable power coupling to transfer power to the secondary power source from a source external to the fixed wing aircraft during takeoff.

Example methods to launch a fixed wing aircraft from a short takeoff platform disclosed herein include providing a fixed wing aircraft having an electrical connection configured to provide power to a propulsion unit of the fixed wing aircraft, connecting the electrical connection of the fixed wing aircraft to an electrical power source associated with a takeoff platform, and providing electrical power to the fixed wing aircraft via the electrical connection during launch of the aircraft from the takeoff platform.

The features, functions, and advantages that have been discussed can be achieved independently in various examples or may be combined in yet other examples further details of which can be seen with reference to the following description and drawings.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
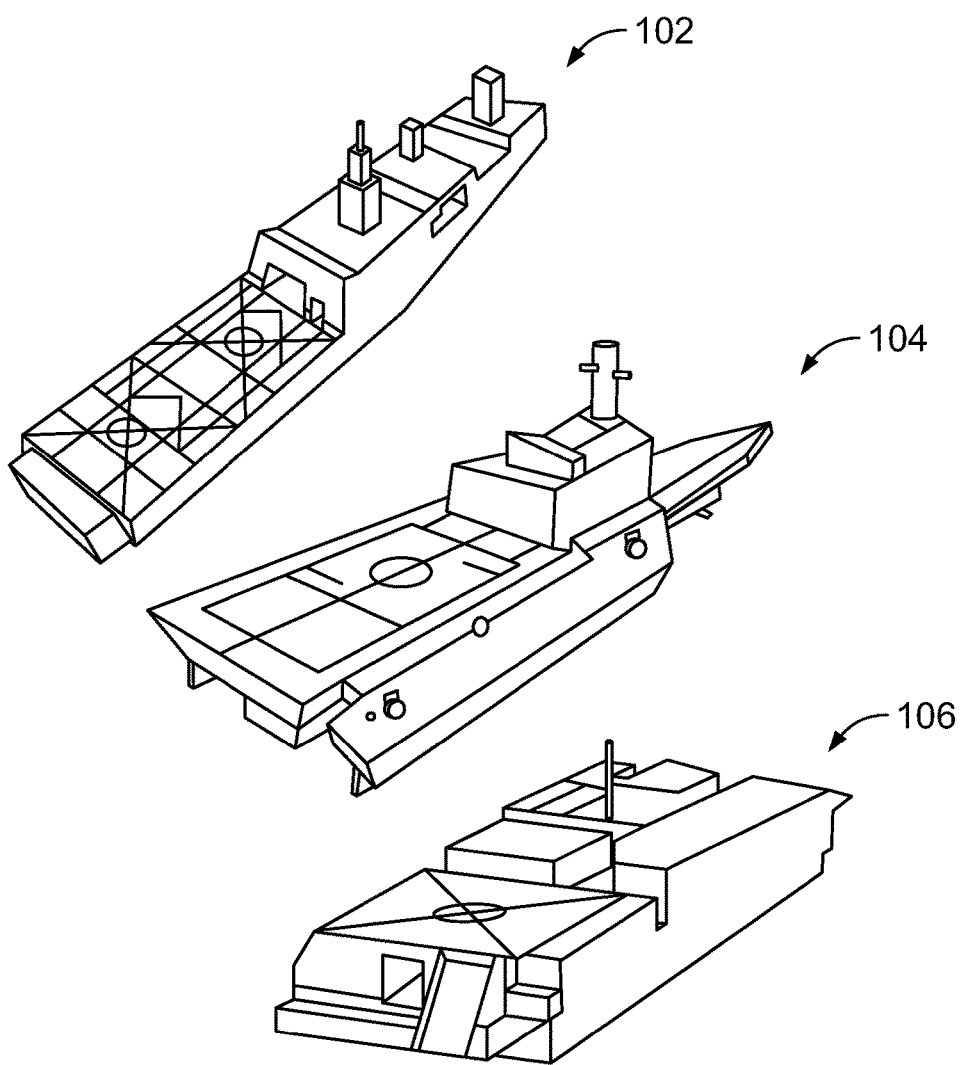
FIG. 1 illustrates take off platforms from which example fixed wing platforms disclosed herein may take off and land.
Figure 1:
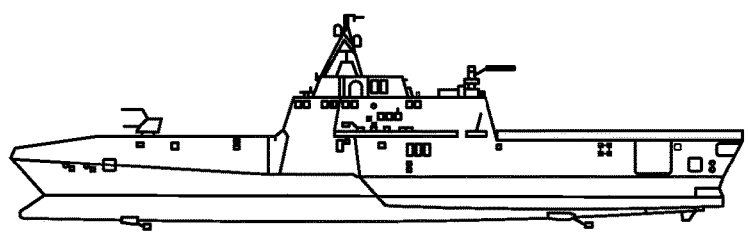
Figure 1:
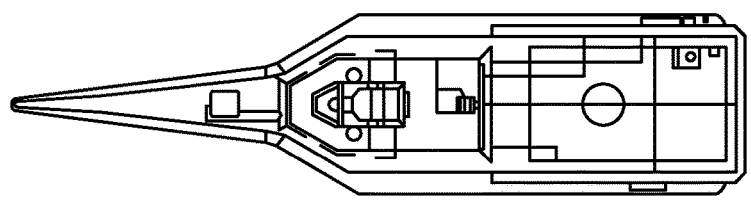

Example methods and apparatus disclosed herein provide a fixed wing platform (e.g., aircraft) that can be launched and/or recovered over short distances (e.g., short takeoff and landing (STOL)).

In some examples, a fixed wing platform includes one or more primary power sources and one or more secondary power sources. In some such examples, the primary power source provides power (e.g., mechanical power) to a driveshaft during cruising (e.g., higher speed travel, such as 120-180 knots or more) and/or loitering (e.g., lower speed travel, such as 60-80 knots or less) stages of flight of the fixed wing aircraft. In some such examples, the primary power source derives its energy from fuel storage on board the fixed wing platform.

In some examples, the secondary power source provides power (e.g., mechanical power) to the driveshaft during a takeoff stage of flight. In some such examples, the secondary power source derives its energy from a ship or other takeoff platform-based source of power. For example, the secondary power source may be an electric motor that is electrically coupled to an electric power source associated with the takeoff platform such as a power plant of a ship from which the fixed wing aircraft is taking off. The secondary power source provides additional power necessary for takeoff, though at a lower weight and/or complexity than providing the required power via an equivalently-powered fuel-based motor and/or adding power capacity to the primary power source (the additional weight of which must then be carried for the duration of the flight, reducing performance and/or capabilities). Examples disclosed herein offload the short-duration power generation, thereby enabling a more efficient design and increasing flight range and/or duration capabilities while maintaining short duration takeoff and/or landing capabilities. At the time of or shortly after takeoff, the electrical connection or coupling between the fixed wing platform and the takeoff platform-based power source is decoupled and the primary power source becomes (or remains) the onboard source(s) of power (e.g., engine(s), batteries, capacitors, etc.) to the fixed wing aircraft.

An example electrical connection or coupling includes a cable connected to a takeoff-platform electrical system. The example cable is connected to the fixed wing platform via friction (e.g., similar to the friction holding a plug in an electrical socket), via a magnetic connector, via adhesive, via a breakable fastener, and/or any other device that may be used to detachably connect the cable to the fixed wing platform.

Another example electrical coupling between the takeoff platform electrical system and the fixed wing platform includes a trolley having a wired or wireless electrical coupling to the fixed wing platform. The example trolley is electrically connected to the takeoff platform electrical system. The example trolley may provide electrical power via wireless transmission (e.g., via magnetic induction) and/or via wired connection (e.g., a connector extending between the trolley and the fixed wing platform. During takeoff, the example trolley travels (e.g., rolls) with the fixed wing platform as the platform gains speed. When the fixed wing platform lifts from the takeoff platform, the trolley is left and/or arrested on the takeoff platform and the electrical coupling is broken off, decoupled, or detached.

While example detachable electrical couplings are disclosed, any other method of detachably coupling the fixed wing aircraft to the takeoff platform may additionally or alternatively be used. The takeoff platform-based power examples disclosed herein enable fixed wing platforms to avoid incurring excess weight and/or complexity that may be unused for non-takeoff aspects of flight.

To reduce a required size of the secondary power source and thereby lower the weight of the fixed wing aircraft, the example primary power source may also provide power to the driveshaft during the takeoff stage. In some other examples, the primary power source does not provide power to the driveshaft to conserve fuel for the primary power source for use during subsequent stages of flight (e.g., cruising, loitering, and/or landing). In some examples, the primary power source or propulsion (e.g. a pair of turbocharged diesel engines) is selected or designed to provide sufficient thrust for cruise conditions, where power requirements are substantially lower than that of conventional and/or vertical takeoff and/or landing (e.g., 10-20% of the power used at takeoff). By using the primary power source during takeoff, overall secondary power needs (and, thus, the size, volume, weight, and/or cost of the secondary power source) may be reduced. In examples in which twin onboard engines are used as the primary power source, both engines may be used for high-power maneuvers such as acceleration, climb, and sprints. In such examples, one engine can be turned off during lower power conditions (e.g., low-speed loitering) and the remaining engine is operated at a more efficient throttle setting to increase the range and/or duration of the flight.

In some disclosed examples, the primary power source includes one or more (e.g., two) gasoline, ethanol, diesel, and/or other fuel-based motor(s). In some other examples, the primary power source additionally includes batteries, capacitors, and/or any other energy storage device(s). Battery and/or capacitor-based primary power sources are advantageous when, for example, shorter flight range is acceptably reduced to achieve reduced acoustic output and/or reduction or elimination of fossil fuel use. In some examples, the power source includes a turbofan, one or more propellers, and/or some combination of a turbofan and propeller(s).

Example fixed wing aircraft disclosed herein are balanced in performance between takeoff, cruise, loiter, and landing phases or stages of flight. In some examples, a fixed wing aircraft is capable of taking off from and/or landing on a short takeoff and landing deck (e.g., less than 50 feet long).

FIG. 1 illustrates take off platforms 102, 104, 106 from which example fixed wing platforms disclosed herein may take off and land. The example take off platforms 102, 104, 106 include the landing deck ships (LSD) or landing platform dock (LPD) ships 102, the littoral combat ships (LCS-2), and military sealift command (MSC) ships 106. However, example fixed wing platforms disclosed herein may take off and/or land from other types of takeoff platforms such as aircraft carriers and/or land-based runways.

Each of the example takeoff platforms 102-106 of FIG. 1 is equipped with internal power systems. The internal power systems may be tapped to provide power to various devices and/or equipment as may be needed to perform the operations or assignments of the takeoff platforms 102-106. In examples disclosed herein, the takeoff platforms 102-106 may be easily modified (permanently and/or temporarily, via modifications to the takeoff platform itself and/or via the use of adaptive equipment) to provide power to assist example fixed wing platforms disclosed herein to takeoff from a short takeoff deck (e.g., 50 feet to 100 feet or less of runway distance).

Figure 2:
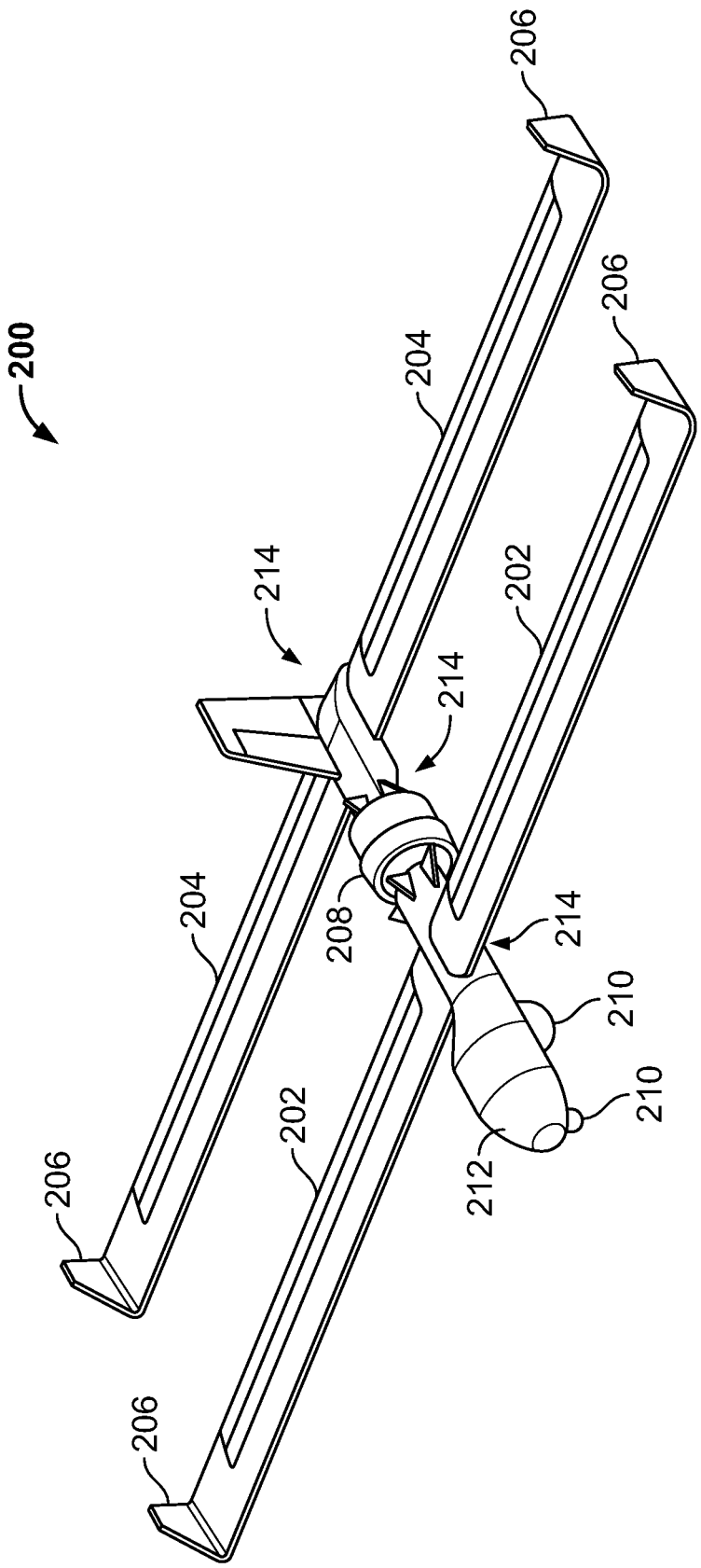
FIG. 2 is an illustration of an example fixed wing platform constructed in accordance with the teachings of this disclosure.

FIG. 2 is an illustration of an example fixed wing platform 200 constructed in accordance with the teachings of this disclosure. The example fixed wing platform 200 of FIG. 2 may be launched and/or recovered using any of the example takeoff platforms 102-106 illustrated in FIG. 1.

The example fixed wing platform 200 of FIG. 2 includes tandem wings 202, 204. The example tandem wings 202, 204 of FIG. 2 are vertically offset, such that the aft wings 204 are higher than the fore wings 202. To enhance lift performance, the example tandem wings 202, 204 are offset both laterally and vertically to minimize downwash on rear wing caused by the forward wing. In some other examples, the tandem wings 202, 204 include the use of an anhedral angle (e.g., wing cants down) on a first one of the wings 202, 204 along with a dihedral angle (e.g., wing cants up) on the other of the wings 202, 204 to further decouple the forward and aft flowfields, thereby improving lift efficiency. The example tandem wings 202, 204 of FIG. 2 include winglets or wing rudders 206 to improve the lateral stability of the platform 200.

The example fixed wing platform 200 of FIG. 2 is propelled by a fan 208. However, other methods of propulsion, such as propellers or jets, may additionally or alternatively be used. The fan 208 is powered by primary and secondary power sources, which are described in more detail below. The primary power source includes one or more engines that provide sufficient energy to power the fan 208 during climb, cruise, and loiter stages of flight. The primary power source also powers other onboard systems such as navigation, communications, surveillance, and/or any other electrical and/or mechanical systems on the platform 200.

The secondary power source in the fixed wing platform 200 is configured to receive power from an external source and is used during takeoff to provide additional power to the fan 208 to achieve sufficient propulsion for taking off from a short takeoff platform. For example, the secondary power source may be an electric motor that is mechanically coupled to the fan 208 (or other propulsion elements as described below with reference to FIGS. 4, 5, 6, and/or 7) to increase a speed or thrust of the fan 208 when connected to the external power source.

The primary power source is coupled to the secondary power source (e.g., a motor and/or a generator) via a shaft. In some examples, the primary power source is configured to supply torque to the secondary power source to enable the secondary power source to serve as a generator in addition to its function as a motor. When electrical power is supplied from the takeoff platform to the aircraft, the secondary power source provides torque to the connection shaft, which in turn supplements the power to the primary power source to propel the aircraft. After the connection to the takeoff platform is broken, the secondary power source may then be converted to generate the electrical power for the aircraft.

The example fixed wing platform 200 of FIG. 2 includes one or more sensors and/or control systems 210, which may be located in a nose region 212 of the platform 200 and/or distributed throughout the fuselage 214 and/or the wings 202-204.

Figure 3:
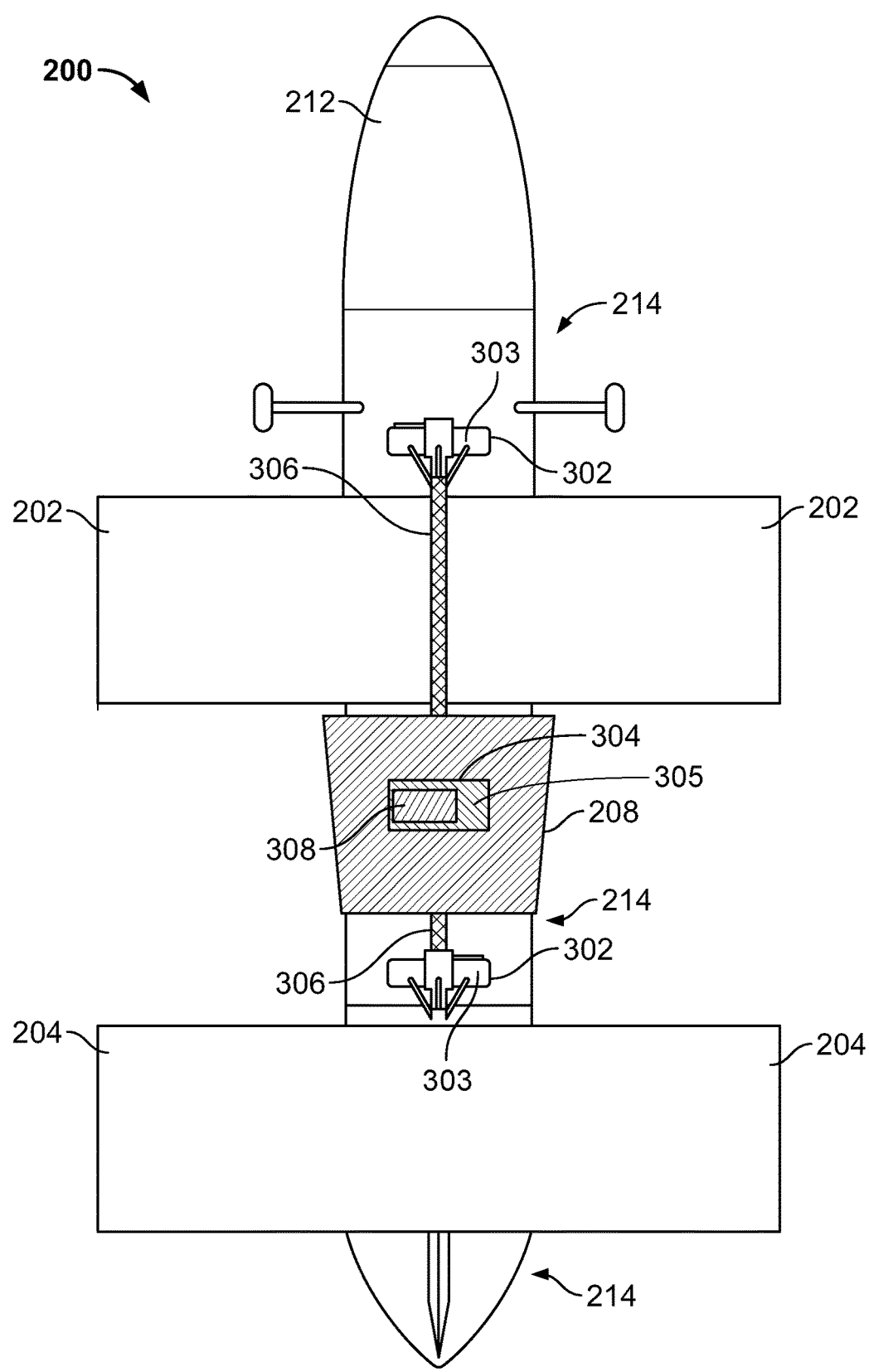
FIG. 3 is a cutaway view of the example fixed wing platform of FIG. 2, showing an example primary power source and an example secondary power source of the fixed wing platform.

FIG. 3 is a cutaway view of the example fixed wing platform 200 of FIG. 2, showing an example primary power source 302 and an example secondary power source 304 of the fixed wing platform 200.

The example primary power source 302 of FIG. 3 includes a pair of diesel or other fuel-based engines 303 located forward of respective ones of the wings 202, 204. The example engines 303 of FIG. 3 are cross-shafted via a driveshaft 306 that drives the fan 208 of FIG. 2 to generate thrust. The example engines 303 of FIG. 3 are configured or selected to generate, in combination, sufficient thrust via the fan 208 for the platform 200 to sustain cruising speeds (e.g., 120-180 knots or more, depending on the application or requirements of the platform 200).

The example secondary power source 304 of FIG. 3 includes one or more electric motors 305 that receive electrical power from an external source (e.g., from a power source associated with the takeoff platform) and augment (e.g., supplement) the power generated by the primary power source 302. For example, the secondary power source 304 may be coupled to the drive shaft 306, such as via a transmission, to increase the power to the drive shaft 306 and, thus, increase the power to the fan 208. The example electric motor 305 is configured or selected to generate sufficient additional thrust in the fan 208 to increase the speed of the fan 208 from the speed obtainable using only the engines 303 to a takeoff speed needed to take off from a short takeoff deck (e.g., the takeoff deck(s) of any of the takeoff platforms 102-106 of FIG. 1).

To receive the electrical power from the external source, the example electric motor 305 may include or be electrically coupled to a power coupling 308. The example power coupling 308 may include, for example, one or more of a physical electrical plug, a breakaway electrical connector, and/or a magnetic induction coil and energy conversion circuit.

A physical electrical plug holds an electrical connection with sufficient friction to maintain the electrical connection during (and shortly after) takeoff, but not so much friction that the platform 200 cannot break or decouple the electrical connection (e.g., overcome the friction) or loses substantial speed in breaking or decoupling the connection after takeoff.

A breakaway electrical connector includes electrical conductors that contact corresponding electrical conductors on the opposite or mating connection. However, unlike a physical electrical plug, a breakaway electrical connector may not rely on friction to hold the electrical contacts together. Instead, example breakaway electrical connectors that may be used to implement the power coupling rely on a separate mechanism to hold the electrical connectors in contact. For example, the mechanism may include one or more magnets in the power coupling. The magnets are arranged such that the polarities of the magnets cause the magnets to attract corresponding magnets on the opposing connector. As with the physical electrical plug, the holding forces of the magnet(s) in the example power coupling 308 are sufficient to maintain the electrical connection during (and shortly after) takeoff, but are not so strong that that the platform 200 cannot overcome the magnetic forces to break the connection or loses substantial speed in breaking the connection after takeoff.

Other example breakaway electrical connectors that may be used to implement the power coupling 308 include mechanical connectors configured to mate and then break when a force threshold (e.g., a threshold force to maintain the connection long enough for the platform 200 to takeoff) is reached.

A magnetic induction coil and conversion circuit may be used to implement the power coupling in combination with the example breakaway mechanism described above and/or using a trolley that rolls with the platform 200 until takeoff. The magnetic induction coil receives power without a physical electrical connection and, in some examples, provides some additional power (e.g., residual energy in the induction coil) after breaking the magnetic coupling between the power coupling 308 and the external power source.

In some examples, the platform 200 of FIGS. 2 and 3 lowers (or kneels) a rear landing gear to increase an angle of attack of the wings 202, 204. For example, the rear landing gear may kneel to increase the angle of attack by about 12-15 degrees. By increasing the angle of attack, the example platform 200 generates more lift and is able to take off at a lower speed.

Figure 4A:
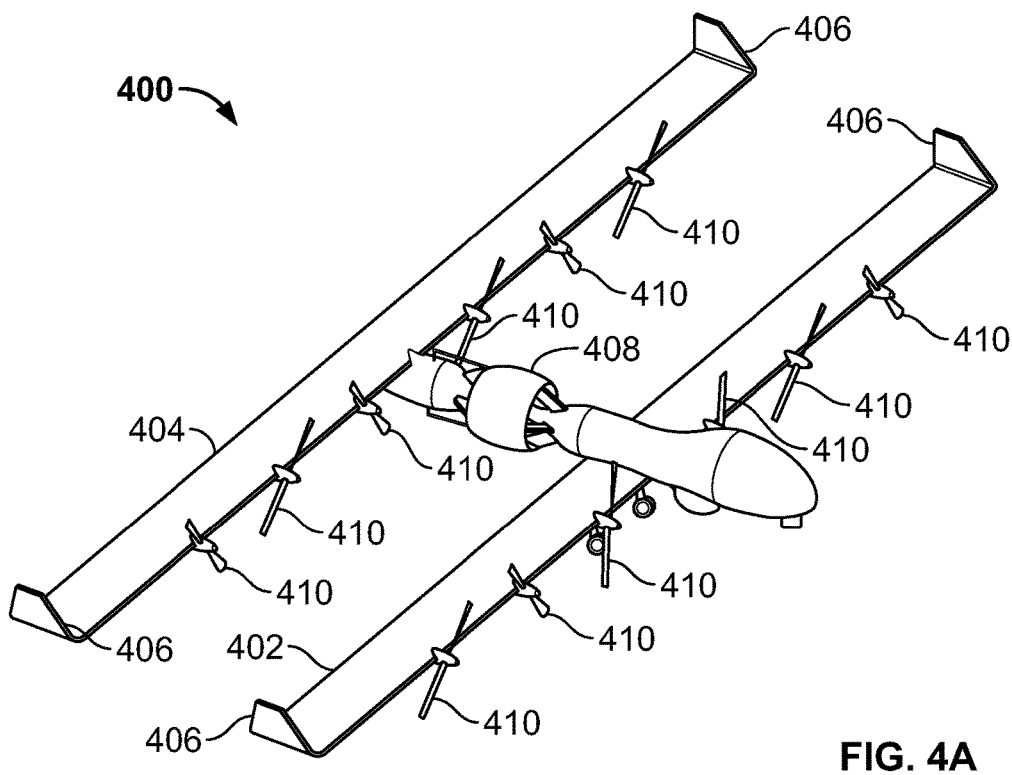
FIGS. 4A, 4B, and 4C illustrate views of another example fixed wing platform constructed in accordance with the teachings of this disclosure.
Figure 4B:
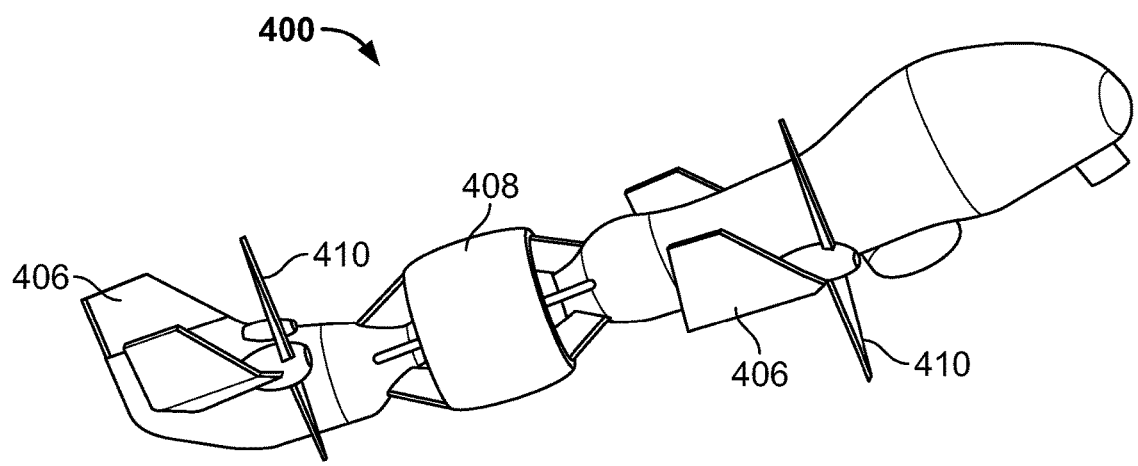
Figure 4C:
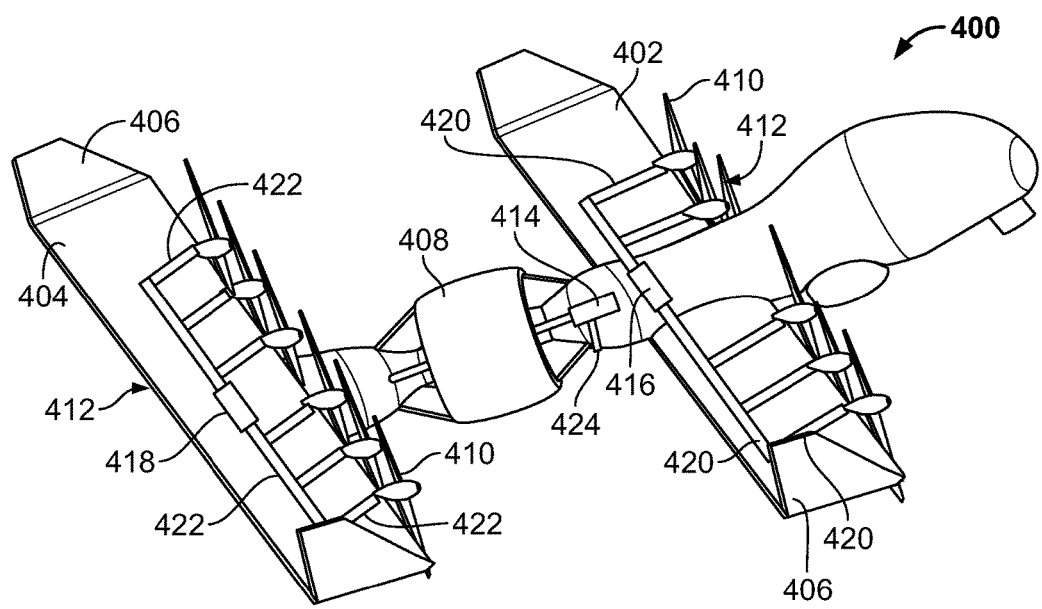

FIGS. 4A, 4B, and 4C illustrate views of another example fixed wing platform 400. Like the example platform 200 of FIGS. 2 and 3, the example fixed wing platform 400 of FIG. 4 includes tandem wings 402, 404, wing rudders 406, and a fan 408. However, unlike the example platform 200 of FIG. 2, the example platform 400 includes propellers 410 in addition to the fan 408.

FIG. 4C illustrates an example primary power source 412 configured to power the propellers 410 and an example secondary power source 414 configured to power the fan 408. The example primary power source 412 includes a first fuel-based engine 416 and a second fuel-based engine 418. The first fuel-based engine 416 powers the propellers 410 coupled to the wing 402 via a first set of driveshafts 420. Similarly, the second fuel-based engine 418 powers the propellers 410 coupled to the rear wing 404 via a second set of driveshafts 422.

The example secondary power source 414 of FIG. 4C powers the fan 408 via electrical power obtained from an external power source (e.g., a power source associated with a takeoff platform) via a power coupling 424. The power coupling 424 may be similar or identical to the example power coupling 308 of FIG. 3 described above.

In some examples, the primary power source 412 (e.g., the first and/or second fuel-based motors 416, 418) is also mechanically coupled to the fan 408. During cruising and/or loitering stages of flight, the primary power source 412 may be configured to use a combination of the propellers 410 and/or the fan 408 to achieve a desired efficiency, speed, and/or range.

Figure 5:
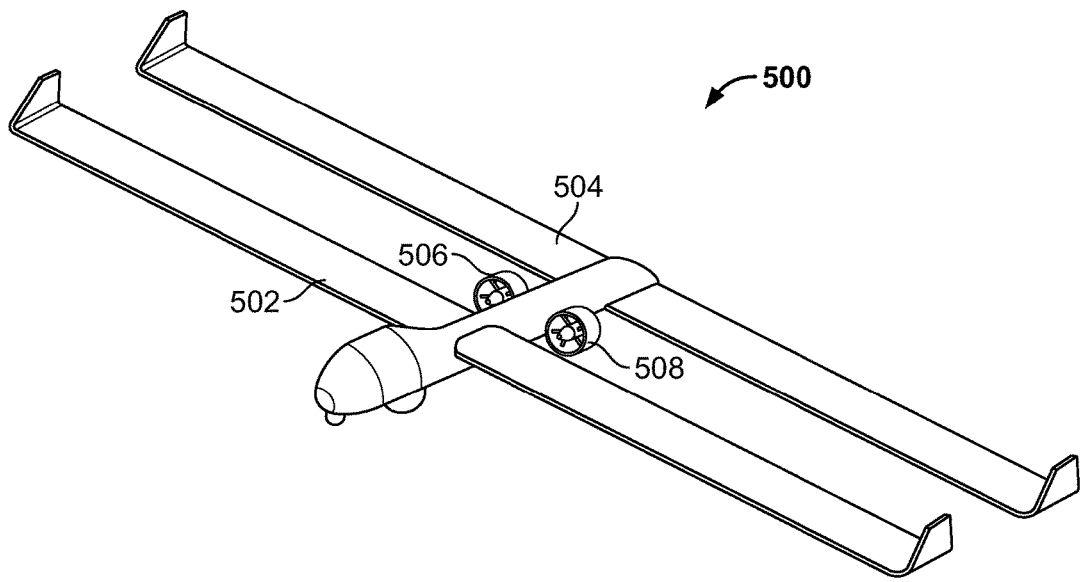
FIG. 5 illustrates another example fixed wing platform constructed in accordance with the teachings of this disclosure.

FIG. 5 illustrates another example fixed wing platform 500. The fixed wing platform 500 illustrated in FIG. 5 includes tandem wings 502, 504. To provide propulsion, the example fixed wing platform 500 of FIG. 5 includes dual fans 506, 508. However, the example fixed wing platform 500 may include any number of fans and/or propellers as described above.

To power the example fans 506, 508 of FIG. 5, the platform 500 includes primary and secondary power sources. The example power sources are coupled to drive the fans 506, 508. For example, the primary power source may include a first fuel-based engine to drive the first fan 506 and a second fuel-based engine to drive the second fan 508. In other examples, the primary power source is configured such that the engines drive all of the fans 506, 508 in cooperation.

The secondary power source is mechanically coupled to the fans 506, 508. The secondary power source receives electrical power from an external source (e.g., a takeoff platform-based electrical source) and increases the power provided to the fans 506, 508 during takeoff.

Figure 6:
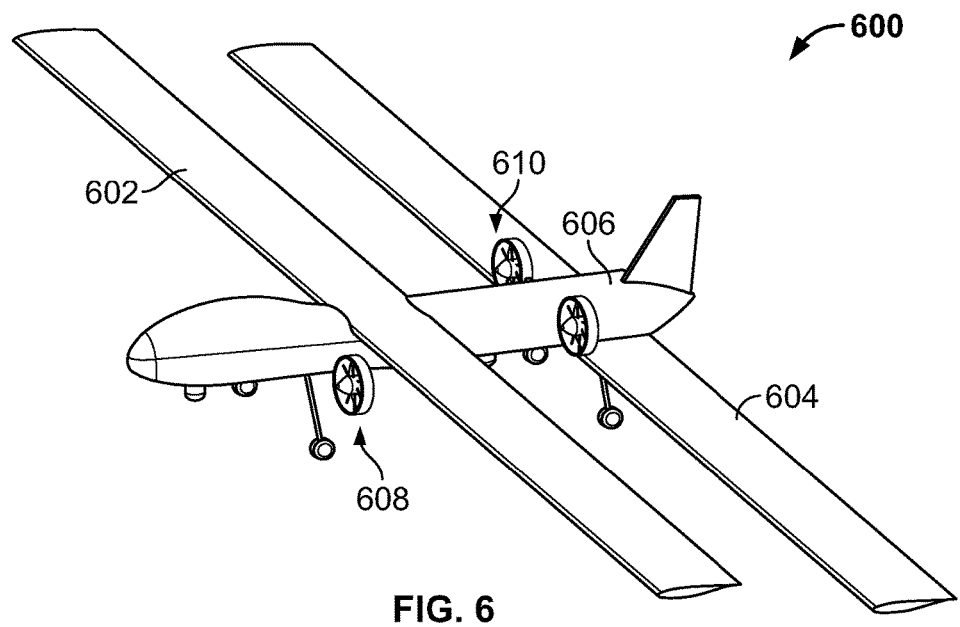
FIG. 6 illustrates yet another example fixed wing platform constructed in accordance with the teachings of this disclosure.

FIG. 6 illustrates yet another example fixed wing platform 600. The example fixed wing platform 600 includes tandem wings 602, 604. However, unlike the tandem wings illustrated in FIGS. 2-5 above, the front tandem wing 602 has a higher position on the fuselage 606 of the platform 600 than the rear tandem wing 604. The example platform 600 includes two pairs of fans 608, 610. The pairs of fans 608, 610 of FIG. 6 may be powered by primary and secondary power sources in a manner similar to the examples described above. The example configuration illustrated in FIG. 6 provides augmented lift qualities in the wing root regions that aid overall aircraft performance.

Figure 7:
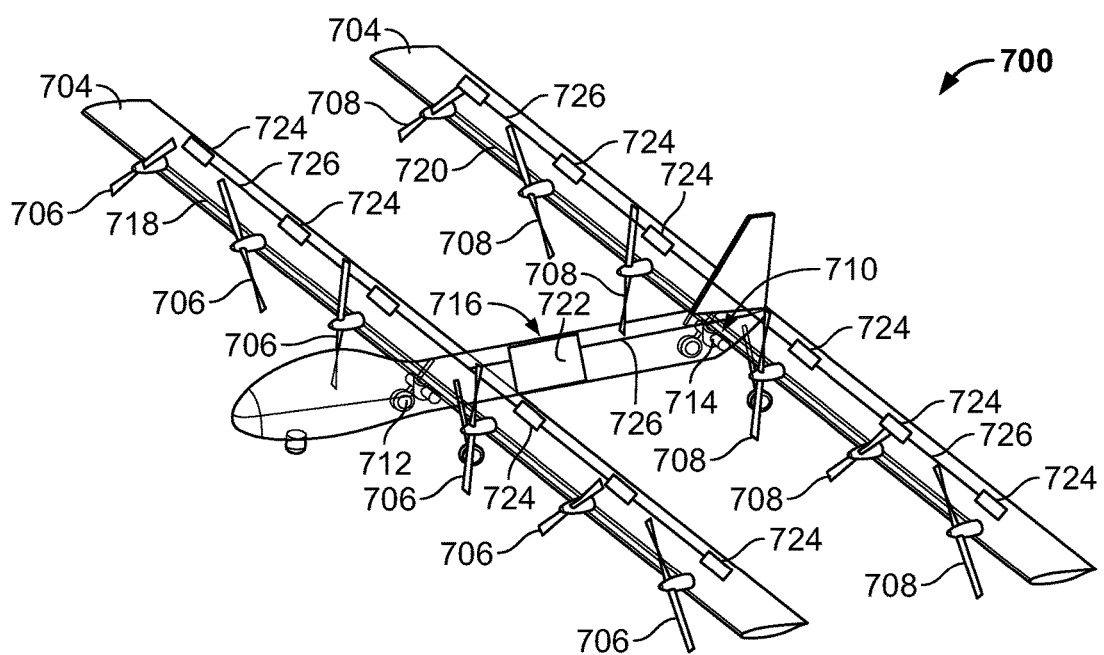
FIG. 7 illustrates still another example fixed wing platform constructed in accordance with the teachings of this disclosure.

FIG. 7 illustrates still another example fixed wing platform 700. The example platform 700 illustrated in FIG. 7 includes tandem wings 702, 704. In contrast with the examples described above, the platform 700 only includes sets of propellers 706, 708 (e.g., does not include a fan). The example propellers 706, 708 are powered by a primary power source 710 including first and second fuel-based engines 712, 714 as described above with reference to FIGS. 4A-4C. The example platform 700 further includes a secondary power source 716. The secondary power source 716 is coupled to the primary power source 710 and/or to driveshafts 718, 720 that deliver power from the primary power source 710 to the propellers 706, 708. The example engines 712, 714 of FIG. 7 are cross-shafted through the secondary power source 716 to provide redundancy.

The example secondary power source 716 may include one electrical motor 722 to augment the primary power source 710. Additionally or alternatively, the secondary power source 716 may include multiple smaller motors 724 and an electrical distribution system 726 to increase the power to all or a subset of the propellers 706, 708 during takeoff. During the climb and/or cruise stages, the example secondary power source 716 (e.g., a motor) may be used as an electrical generator to supply power to the aircraft subsystems.

Figure 8A:
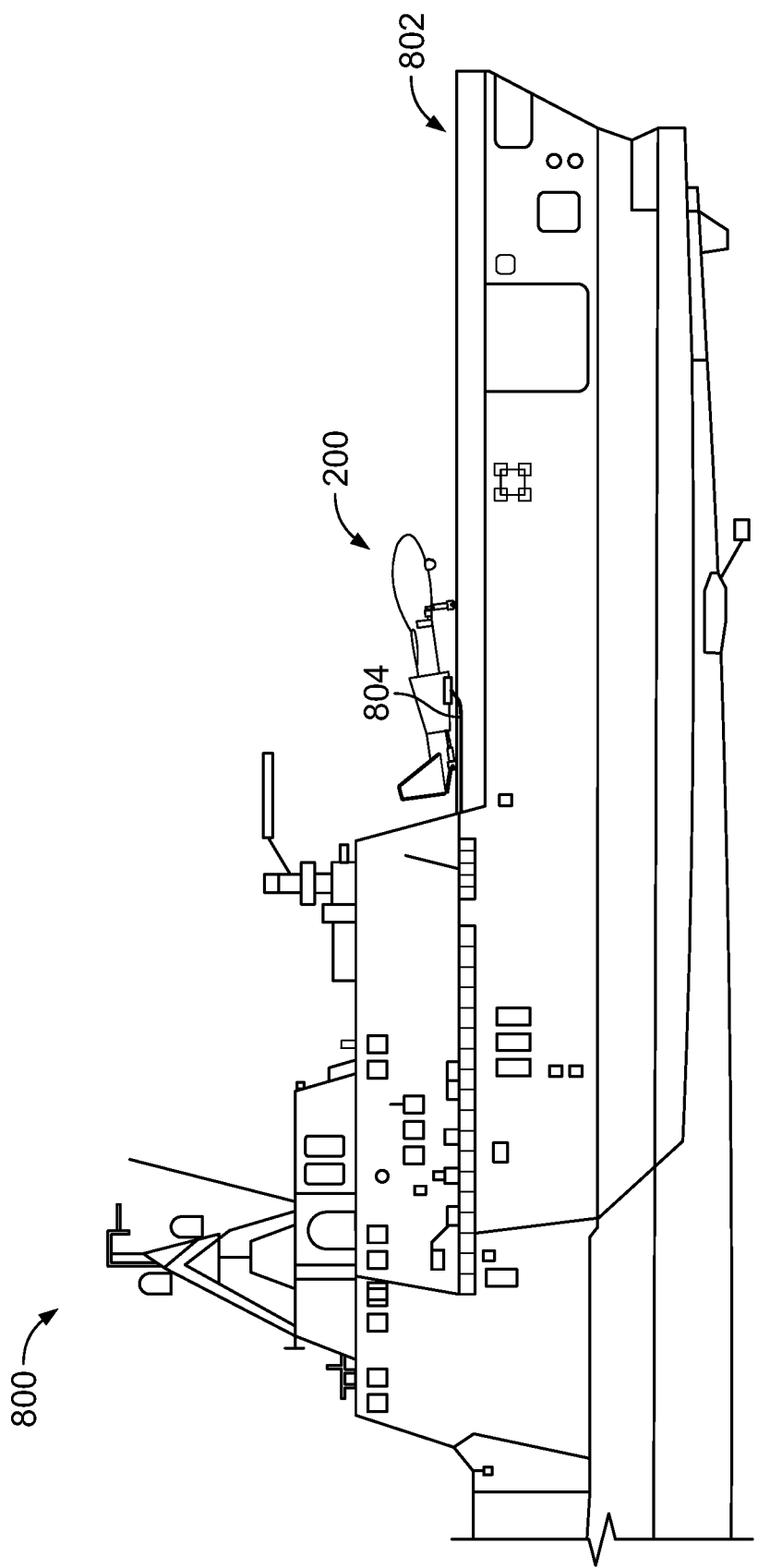
FIGS. 8A-8C illustrate an example of the fixed wing platform of FIG. 2 taking off from a short takeoff deck.
Figure 8B:
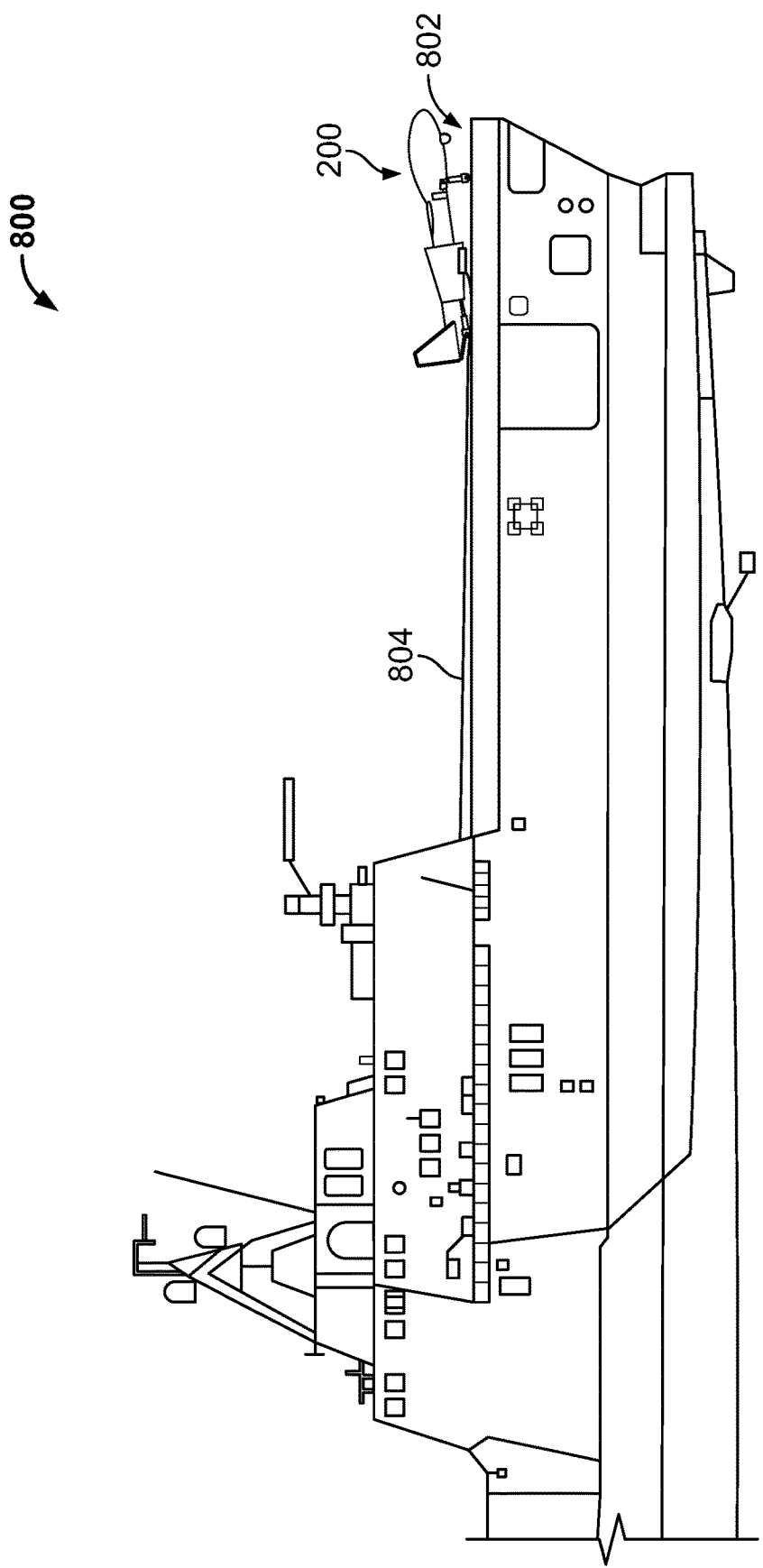
Figure 8C:
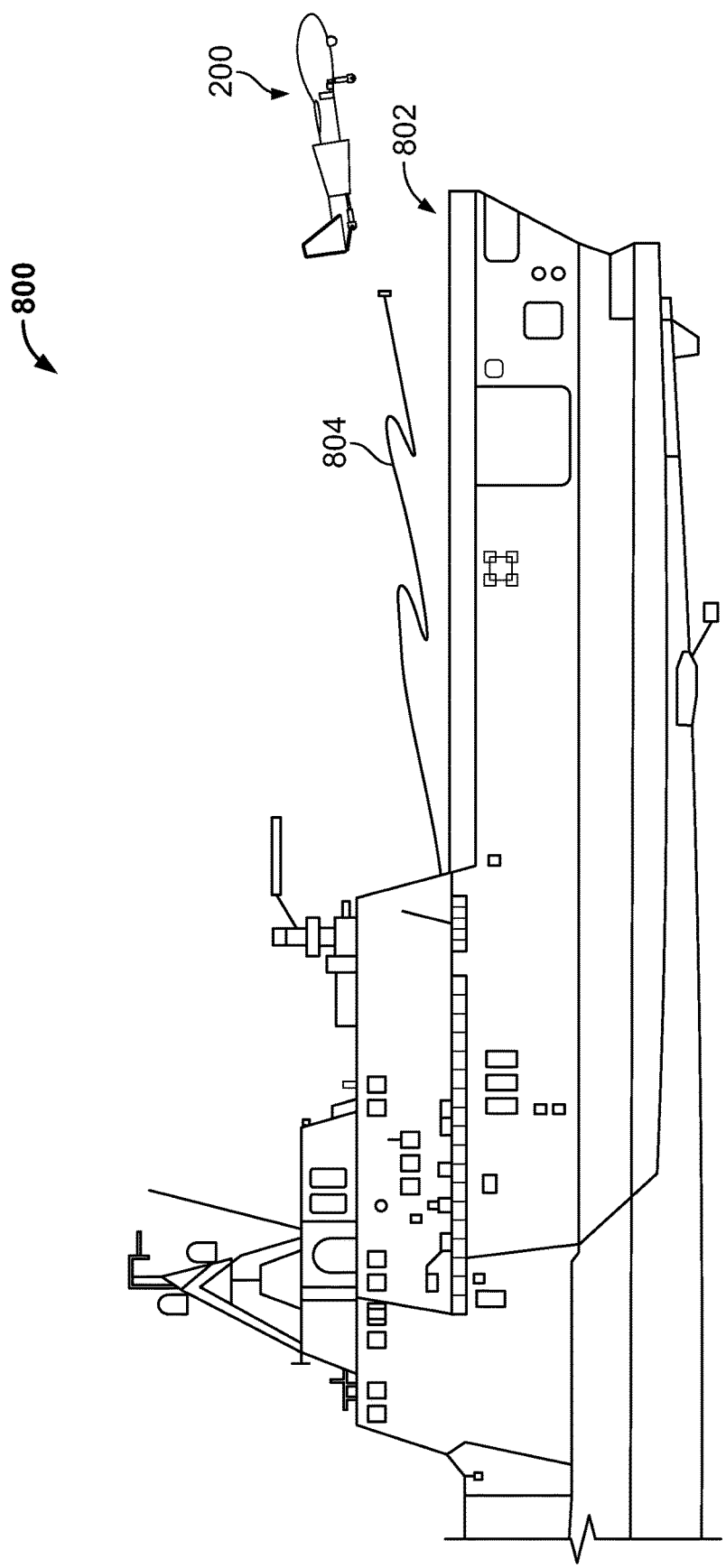

FIGS. 8A-8C illustrate an example of the fixed wing platform 200 of FIG. 2 taking off from a short takeoff deck 802 associated with a takeoff platform 800. The example of FIGS. 8A-8C may be implemented using any of the example platforms of FIGS. 2-7 and/or using a platform utilizing a combination of the features of the above examples. The example platform 800 may be any of the example takeoff platforms 102-106 described above with reference to FIG. 1. In the example of FIGS. 8A-8C, the takeoff deck 802 includes (and/or has been modified to include) an electrical power source capable of being detachably coupled to the fixed wing platform 200 during takeoff of the platform 200.

FIG. 8A illustrates the example platform 200 at a starting location (e.g., prior to beginning a takeoff sequence). Prior to beginning takeoff, the example platform 200 is connected to an electrical power source at the takeoff deck (e.g., via a cable 804). For example, a cable 804 may be connected to the platform 200 (and/or to an electrical system of the platform 800) by personnel associated with conducting the operations of the platform 200 and/or the platform 800. The platform 200 also kneels the rear landing gear to increase an angle of attack of the wings of the platform 200 by 12-15 degrees to increase lift coefficients.

When the platform 200 has been connected, it may initiate takeoff and apply both the primary power source and the secondary power source power to the fan 208 of the fixed wing platform 200. FIG. 8B illustrates the example platform 200 after initiating takeoff but prior to taking off from the deck 802. The example cable 804 remains attached to the example platform 200 to enable the secondary power source to continue to provide thrust for takeoff. The cable 804 may, for example, uncoil from a coiled arrangement, unwind from a reel, or otherwise extend the length of the cable 804 to remain attached to the platform 200 as the platform 200 moves along the deck 802.

When the platform 200 has taken off and extended the cable 804 to its upper length limit (e.g., maximum length, upper length limit set by personnel to be less than the maximum length, etc.), the example platform 800 breaks or decouples the connection with the cable 804. The cable 804 detaches from the platform 200. In some cases, a tension applied to the cable 804 by the platform 200 and the attachment device (e.g., the power coupling 308 of FIG. 3, friction, a magnetic or mechanical attachment, etc.) prior to detachment of the cable 804 may cause the cable 804 to snap back toward the platform 800. When the platform 200 no longer has a need for the excess power provided by the platform 800, the primary power source of the platform 200 takes over and provides propulsion power. When the platform 200 reaches cruise stage flight conditions, one or more of multiple power plants making up the primary power source can be shut off to improve flight performance (e.g., achieve more energy-efficient flight).

Figure 9:
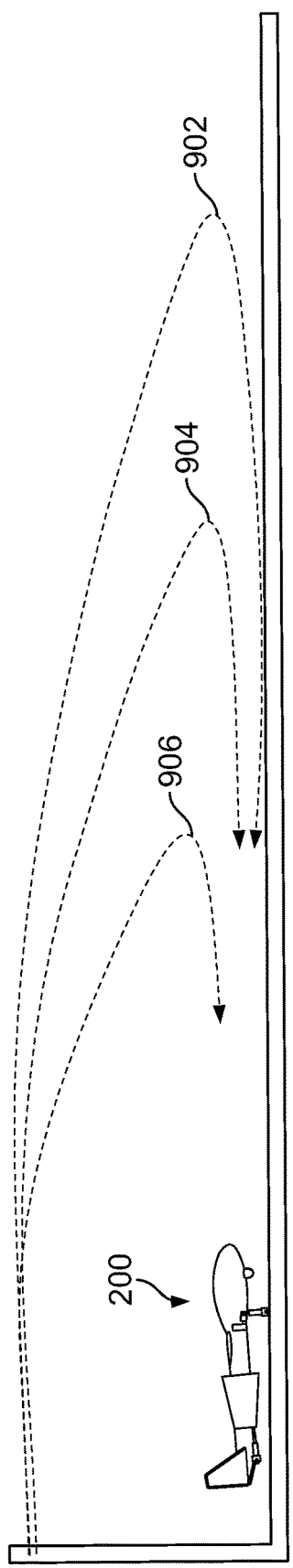
FIG. 9 illustrates example wind or turbulence patterns of a takeoff platform that may be used to increase lift of the fixed wing platform at takeoff.

FIG. 9 illustrates example wind or turbulence patterns 902-906 of a takeoff platform (e.g., the takeoff platforms 102-106 of FIG. 1) that may be used to increase lift of a fixed wing platform (e.g., the fixed wing platform 200 of FIG. 2) at takeoff. The example turbulence patterns 902-906 are simplified representations of turbulence that may occur as the result of a windward structure of a takeoff platform (e.g., a structure of the takeoff platform located between the fixed wing platform 900 and the wind). Such wind or turbulence patterns 902-906 may be leveraged to decrease a takeoff distance of the fixed wing platform 200 by, for example, orienting the takeoff platform with respect to the wind to generate the turbulence patterns 902-906.

Figure 10:
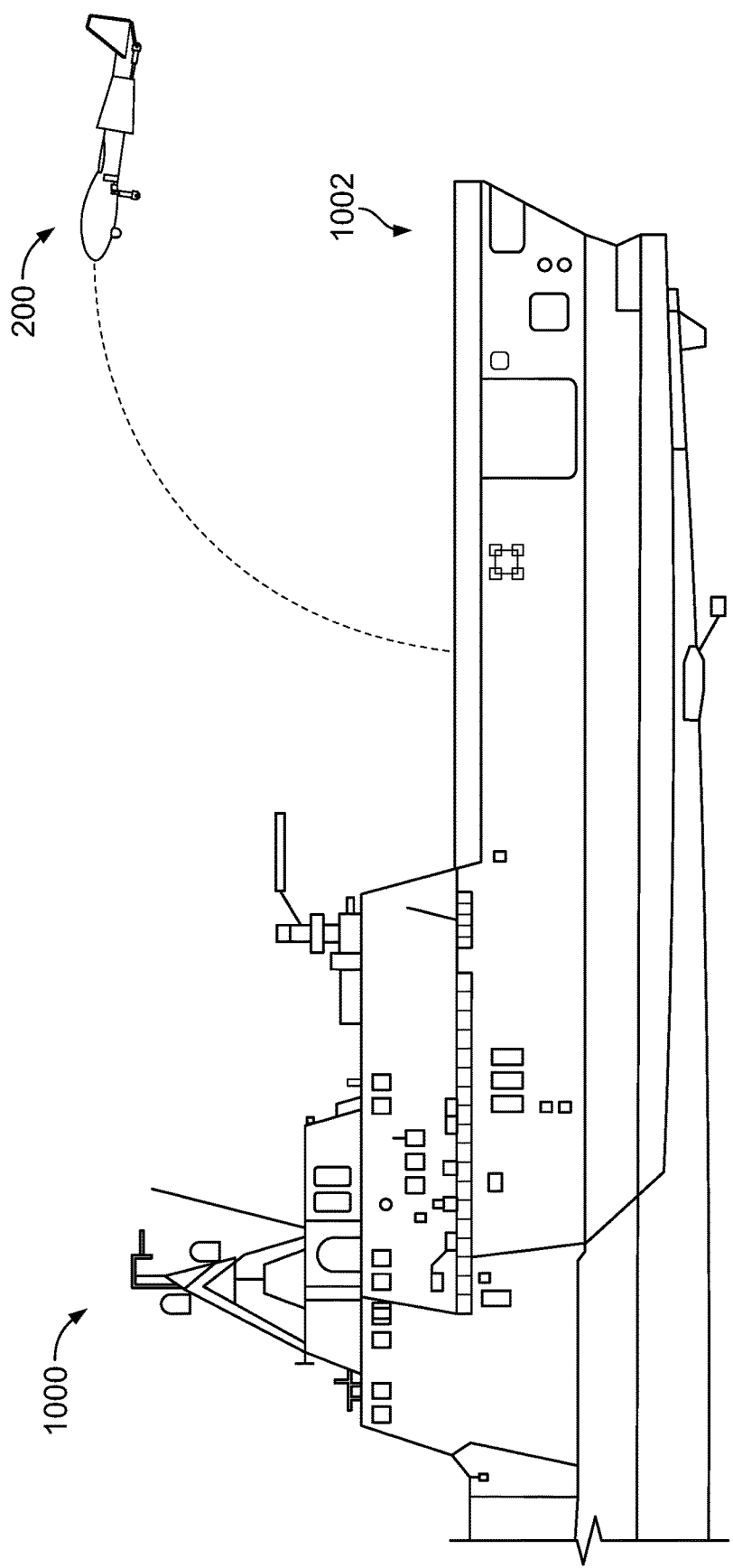
FIG. 10 illustrates an example of the fixed wing platform landing on a short landing deck.

FIG. 10 illustrates an example of the fixed wing platform (e.g., the fixed wing platform 200 of FIG. 2) landing on a short landing deck 1002 associated with a landing platform 1000 (e.g., the landing platforms 102-106 of FIG. 1). The landing platform 1000 and/or the landing deck 1002 of FIG. 10 may be the same or different as the landing platform 800 and/or the landing deck 802 of FIGS. 8A-8C.

To perform a landing on the short landing deck 1002 of FIG. 10, the fixed wing platform 200 reduces its speed to substantially match the speed of the landing deck 1002 (e.g., of the landing platform 1000) or reduce (e.g., minimize) a relative velocity difference between the aircraft and the landing platform 1000. In some examples, the fixed wing platform 200 may have a speed that is slightly higher than the speed of the landing deck 1002 but that permits the fixed wing platform 200 to land and stop on the landing deck 1002 within the space provided on the landing deck 1002.

As the platform 200 approaches the landing deck 1002, wind or turbulence patterns produced by the landing platform 1000 (e.g., ship) and illustrated by 902-906 of FIG. 9 begin to affect the platform 200. As the platform 200 comes over the stern of the landing platform 1000 (e.g., ship), the platform 200 begins a mild descent into the landing platform's 1000 turbulent wake (referred to as "burble"). As the platform 200 descends into the burble, the platform 200 encounters levels of turbulence having decreasing velocities (e.g., from 902 to 904 to 906 of FIG. 2). Burble velocity reductions result in loss of lift for the platform 200. As a result, the descent gradient (e.g., the rate of vertical sink per unit of forward travel) increases sharply as a function of shear turbulence layers penetrated (902, 904, 906). Thus, while the example platform 200 may approach the landing platform 1000 on a small glide slope angle, the influence of the burble shear layers may result in losses of lift in the terminal (e.g., final) portions of the landing. The resulting loss of lift produces a nearly vertical drop by the platform 200 relative to the landing platform 1000, where braking or a simple arresting system of the landing platform 1000 may be used to stop any residual forward travel (e.g., relative to the landing platform 1000).

The winglets 206 on the fixed wing platform 200 provide additional lateral stability against turbulence that may occur during the landing process. The winglets 206 may be included on the front wings 202 and/or the rear wings 204, and have a size based on requisite control power required for the particular platform 200. In some other examples, the wings 202, 204 have a combination of anhedral and dihedral angles (described above) and outboard split flap ailerons in lieu of the winglets 206.

Figure 11:
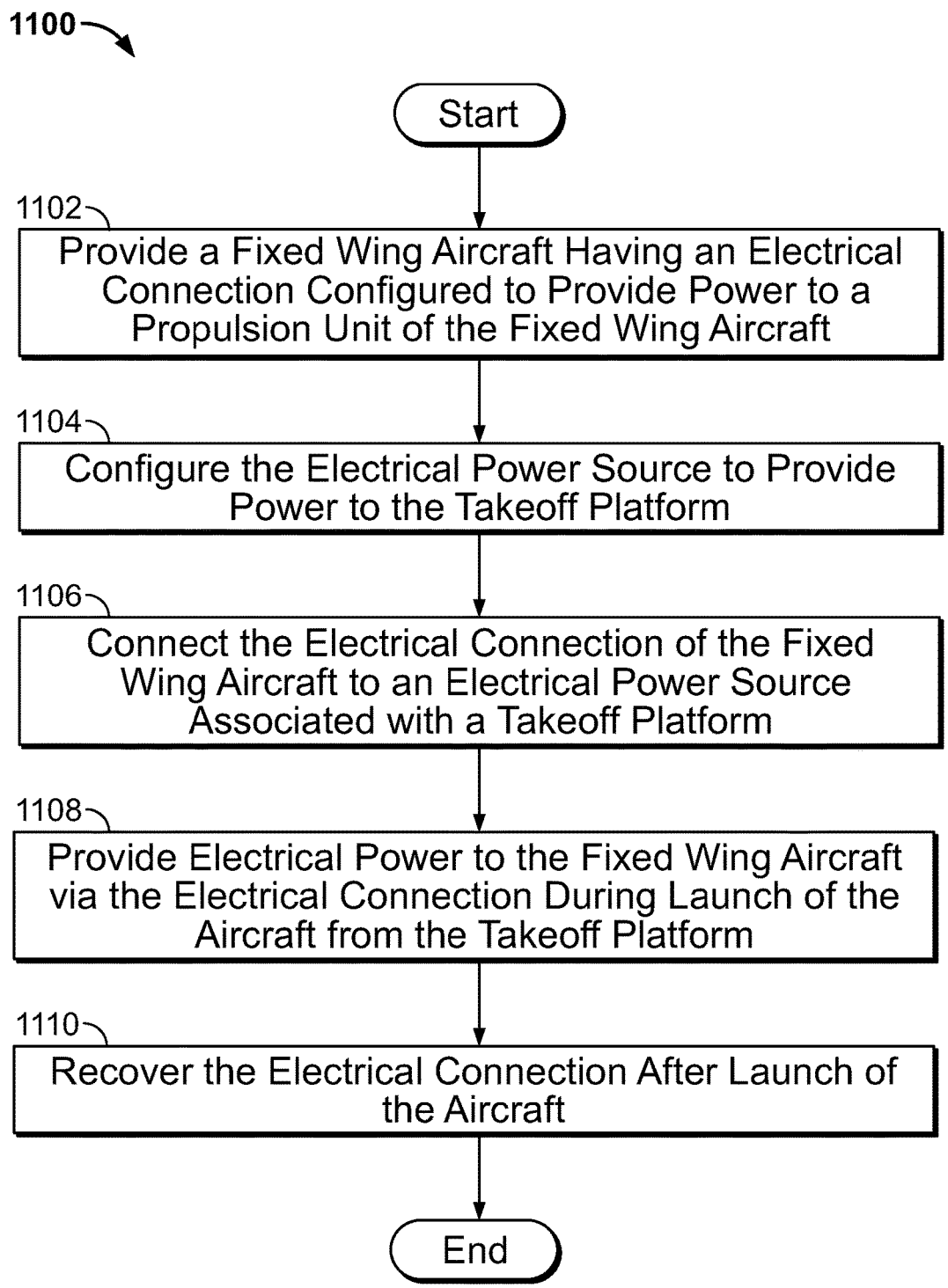
FIG. 11 is a flowchart representative of an example method to launch a fixed wing aircraft from a short takeoff deck.

FIG. 11 is a flowchart representative of an example method 1100 to launch a fixed wing aircraft from a short takeoff deck. The example method 1100 may be used with any of the example fixed wing aircraft 200, 400, 500, 600, and/or 700 of FIGS. 2-7 and/or the example takeoff platforms 102-106, 800, 1000 of FIGS. 1, 8A-8C, and/or 10.

The method 1100 includes providing a fixed wing aircraft having an electrical connection configured to provide power to a propulsion unit of the fixed wing aircraft (block 1102). For example, any of the fixed wing aircraft 200, 400, 500, 600, and/or 700 of FIGS. 2-7 may be set in a starting position on a takeoff deck such as the deck 802 of FIGS. 8A-8C.

The method further includes configuring the electrical power source to provide power to the takeoff platform (block 1104). For example, an electrical system of the takeoff platform 102-106, 800, 1000 may be modified to provide a required voltage and/or current to provide sufficient power to launch the fixed wing platform. In some other examples, the electrical system may be supplied with an adaptive device (e.g., a transformer, an inverter, etc.) to enable the electrical system to provide the required voltage and/or current.

The electrical connection of the fixed wing aircraft is connected to an electrical power source associated with a takeoff platform (block 1106). For example, an electrical cable may be plugged in and/or a trolley containing a magnetic induction coil may be positioned adjacent the takeoff platform.

The method 1100 further includes providing electrical power to the fixed wing aircraft via the electrical connection during launch of the aircraft from the takeoff platform. For example, the electrical power provides sufficient additional thrust to enable the fixed wing aircraft to launch from the takeoff deck.

In some examples, the example method 1100 includes recovering the electrical connection after launch of the aircraft. For example, an electrical connection such as a cable may be discarded from the aircraft after launch (e.g., when the cable has reached its maximum length). The cable may be collected and/or rewound to an initial position for a subsequent launch. The example method 1100 then ends.

Figure 12:
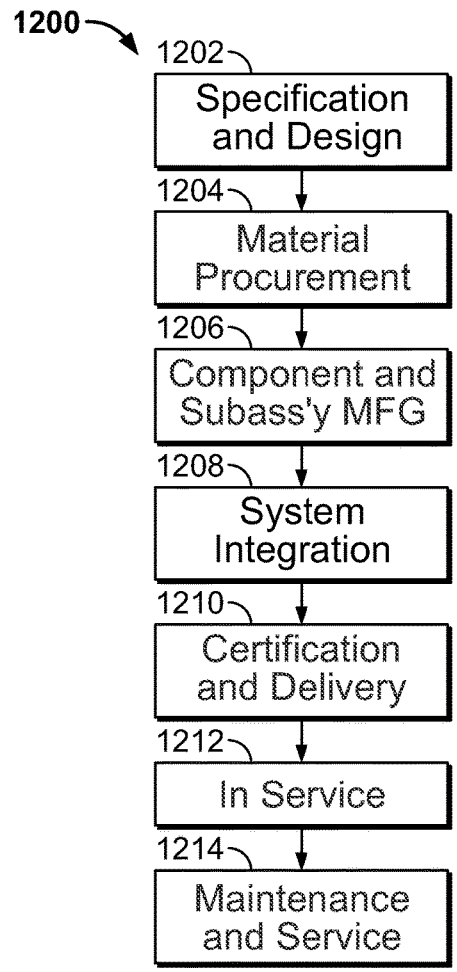
FIG. 12 is a flowchart of platform production and service methodology.
Figure 13:
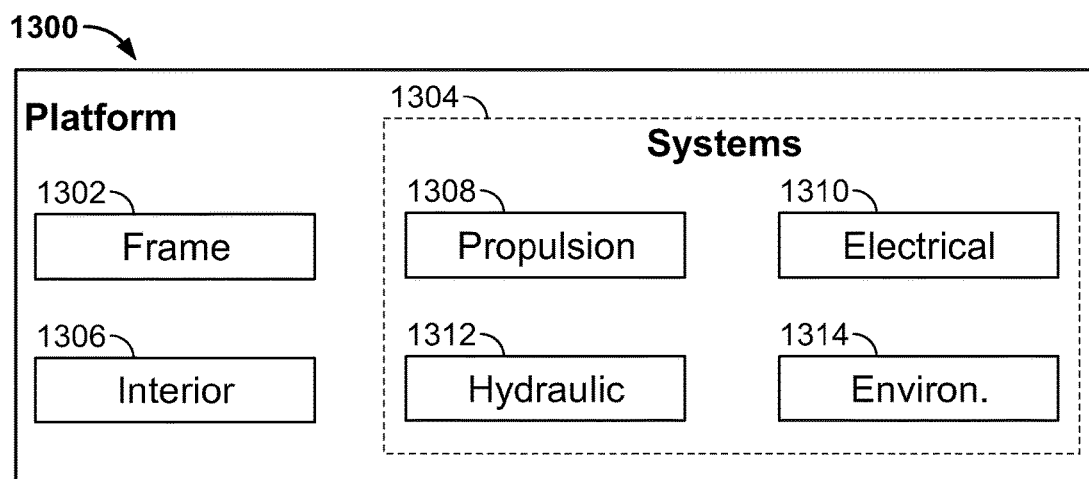
FIG. 13 is a block diagram of a platform.

Examples of the disclosure may be described in the context of a platform manufacturing and service method 1200 as shown in FIG. 12 and a platform 1300, such as an aircraft, as shown in FIG. 13. During preproduction, the example method 1200 may include specification and design (block 1202) of the platform 1300 (e.g., an aircraft). Preproduction may further include material procurement (block 1204). During production, component and subassembly manufacturing (block 1206) and system integration (block 1208) of the platform 1300 (e.g., an aircraft) takes place. Thereafter, the platform 1300 (e.g., an aircraft) may go through certification and delivery (block 1210) in order to be placed in service (block 1212). While in service by a customer, the platform 1300 (e.g., an aircraft) is scheduled for routine maintenance and service (block 1214), which may also include modification, reconfiguration, refurbishment, etc.

Each of the operations of the example method 1200 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 13, the platform 1300 (e.g., an aircraft) produced by example method 1200 may include a frame 1302 with a plurality of systems 1304 and an interior 1306. Examples of high-level systems 1304 include one or more of a propulsion system 1308, an electrical system 1310, a hydraulic system 1312, and an environmental system 1314. The example systems and methods disclosed herein may be integrated into the example systems 1304, 1308, 1310, 1312, 1314. Any number of other systems may be included.

Apparatus and methods embodied herein may be employed during any one or more of the stages of the production and service method 1200. For example, components or subassemblies corresponding to production process 1206 may be fabricated or manufactured in a manner similar to components or subassemblies produced while the platform 1300 (e.g., an aircraft) is in service 1212. Also, one or more apparatus embodiments, method embodiments, or a combination thereof may be implemented during the production stages 1206 and 1208, for example, by substantially expediting assembly of or reducing the cost of a platform 1300 (e.g., an aircraft). Similarly, one or more of apparatus embodiments, method embodiments, or a combination thereof may be utilized while the platform 1300 (e.g., an aircraft) is in service 1212, for example and without limitation, to maintenance and service 1214.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fixed wing aircraft, comprising:
   a propulsion unit;
   a primary power source configured to provide mechanical power to the propulsion unit;
   a secondary power source configured to provide mechanical power to the propulsion unit; and
   a detachable power coupling configured to transfer electrical power to the secondary power source from a source external to the fixed wing aircraft during takeoff, wherein the detachable power coupling is coupled to the source external to the aircraft via a cable, wherein the detachable power coupling is detached from the aircraft when the aircraft is a distance away from the source external to the aircraft that exceeds a length of the cable.

2. A fixed wing aircraft as defined in claim 1, wherein the secondary power source comprises an electric motor.

3. A fixed wing aircraft as defined in claim 2, wherein the primary power source is configured to provide power to the electric motor following takeoff, the electric motor is configured to generate and provide electrical power to an aircraft subsystem when receiving power from the primary power source.

4. A fixed wing aircraft as defined in claim 1, wherein the detachable power coupling comprises at least one of an electrical plug, a breakaway coupling, or a magnetic induction coil.

5. A fixed wing aircraft as defined in claim 1, wherein the primary power source comprises two or more fuel-based engines.

6. A fixed wing aircraft as defined in claim 5, wherein the fuel-based engines are cross-shafted to the secondary power source.

7. A fixed wing aircraft as defined in claim 5, wherein the primary power source further comprises an energy storage device to store electrical energy and to provide the electrical energy to the propulsion unit.

8. A fixed wing aircraft as defined in claim 5, wherein the primary power source is configured to disable at least one of the fuel-based engines during at least one of cruise stage or a loiter stage of flight.

9. A fixed wing aircraft as defined in claim 1, wherein the primary power source is capable of providing sufficient power for a cruise stage of flight but is not capable of providing sufficient power for a takeoff stage of flight.

10. A method to launch a fixed wing aircraft from a short takeoff platform, the method comprising:
    providing a fixed wing aircraft having an electrical connection configured to provide power to a propulsion unit of the fixed wing aircraft;
    connecting the electrical connection of the fixed wing aircraft to an electrical power source associated with a takeoff platform; and
    providing electrical power to the fixed wing aircraft via the electrical connection during launch of the aircraft from the takeoff platform, wherein the electrical connection is connected to the electrical power source associated with the takeoff platform via a cable, wherein the cable is detached from the aircraft when the aircraft is a distance away from the electrical power source that exceeds a length of the cable.

11. A method as defined in claim 10, further comprising recovering the electrical connection after launch of the aircraft.

12. A method as defined in claim 10, further comprising configuring the electrical power source to provide power to the takeoff platform.

13. A method as defined in claim 10, wherein connecting the electrical connection of the fixed wing aircraft to an electrical power source comprises plugging the cable into the electrical connection of the fixed wing aircraft, the electrical connection comprising an electrical plug.

14. A method as defined in claim 10, wherein a primary power source of the fixed wing aircraft is capable of providing sufficient power for a cruise stage of flight but is not capable of providing sufficient power for a takeoff stage of flight.

* * * * *